United States Patent [19]

Naganuma

[11] Patent Number: 4,909,567

[45] Date of Patent: Mar. 20, 1990

[54] VEHICLE BODY CONSTRUCTION

[75] Inventor: Yasunori Naganuma, Fujisawa, Japan

[73] Assignee: Nissan Motor Company, Ltd., Japan

[21] Appl. No.: 329,617

[22] Filed: Mar. 28, 1989

[30] Foreign Application Priority Data

Mar. 30, 1989 [JP] Japan .................................. 64-76992

[51] Int. Cl.⁴ ............................................ B62D 25/06
[52] U.S. Cl. .................... 296/210; 296/84.1; 296/188
[58] Field of Search .............. 296/210, 188, 194, 84.1, 296/201

[56] References Cited

U.S. PATENT DOCUMENTS 4,417,762 11/1983 Imai et al. ............................ 296/210
4,560,198 12/1985 Katano et al. ....................... 296/194
4,775,181 10/1988 Shoda .................................. 296/210

Primary Examiner—Robert R. Song
Attorney, Agent, or Firm—Lowe, Price, LeBlanc, Becker & Shur

[57] ABSTRACT

A front roof rail is connected at an end portion to a trifurcated joint member which is in turn connected to a roof side rail inner and a front pillar inner. A buckling guide is provided to the front roof rail so that the front roof rail is liable to buckle in the place spaced away from the end portion toward a central portion when an external force is applied to a front corner portion of a roof in case of an accident as overturn of a vehicle. The buckling guide is constituted by a reinforcement member secured to the front roof rail or by a bead formed in the front roof rail.

6 Claims, 5 Drawing Sheets

VEHICLE BODY CONSTRUCTION

BACKGROUND OF THE INVENTION

I. Field of the Invention

The present invention relates in general to a vehicle body construction and more particularly to a front roof rail and its adjacent framework of an automotive vehicle body.

II. Description of the Prior Art

FIGS. 7-9 show a prior art vehicle body construction including a front roof rail 1, a pair of roof side rail inners 2, 2 and a pair of front pillar inners 3, 3. The front roof rail 1 are connected at the opposite end portions to trifurcated corner joint members 4, 4 which are in turn connected to the respective roof side rail inners 2, 2 and front pillar inners 3, 3. A similar vehicle body construction is disclosed in Japanese Provisional Patent Publication No. 57-47255.

The vehicle body construction has a larger strength at the joints between the front roof rail 1 and the respective corner joint members 4, 4 since they are laid one upon the other. The strength of the vehicle body construction at and near the joints between the front roof rail 1 and the corner joint members 4, 4 therefore varies largely. The front roof rail 1 has near the corner joint members 4, 4, work holes or access holes 5, 5 used for performing spot welding and installation of interior parts. Such access holes 5, 5 further enhances variation of the strength of the vehicle body construction near the end portions of the front roof rail 1. Due to this, when the front corner portion of the roof is subjected to an external force in an accident as overturn of a vehicle, the vehicle body is liable to buckle or bend at and near the joint between the corner joint member 4 and the front roof rail 1, causing an associated windshield glass or panel 8 to break near the buckled portion of the vehicle body construction. When the windshield panel 8 is broken, a particular portion of the front roof rail 1 is bent largely as shown in FIG. 8. Such breakage of the windshield panel 8 and bending of the front roof rail 1 is undesirable from the passenger's safety point of the view.

SUMMARY OF THE INVENTION

In accordance with the present invention, there is provided a vehicle body construction which comprises a front roof rail having an end portion and a central portion, a roof side rail inner, a front pillar inner, a trifurcated joint member joined to the end portion of the front roof rail and further to the roof side rail inner and the front pillar inner an bucking guide means for determining the place at which the front roof rail is liable to buckle in such a way that the above described place is spaced away from the above described end portion toward the above described central portion This structure is effective for overcoming the above noted problem inherent in the prior art construction.

It is accordingly an object of the present invention to provide an improved vehicle body construction which is desirable from a passenger's safety point of view.

It is another object of the present invention to provide an improved vehicle body construction of the above described character which can elevate the load at which an associated windshield panel breaks.

It is a further object of the present invention to provide an improved vehicle body construction of the above described character which can reduce a degree of buckling or bending at a particular portion of a roof side rail when a front corner portion of a roof is subjected to an external force in an accident as overturn of a vehicle.

DESCRIPTION OF THE PREFERRED EMBODIMENTS

Figure 1:
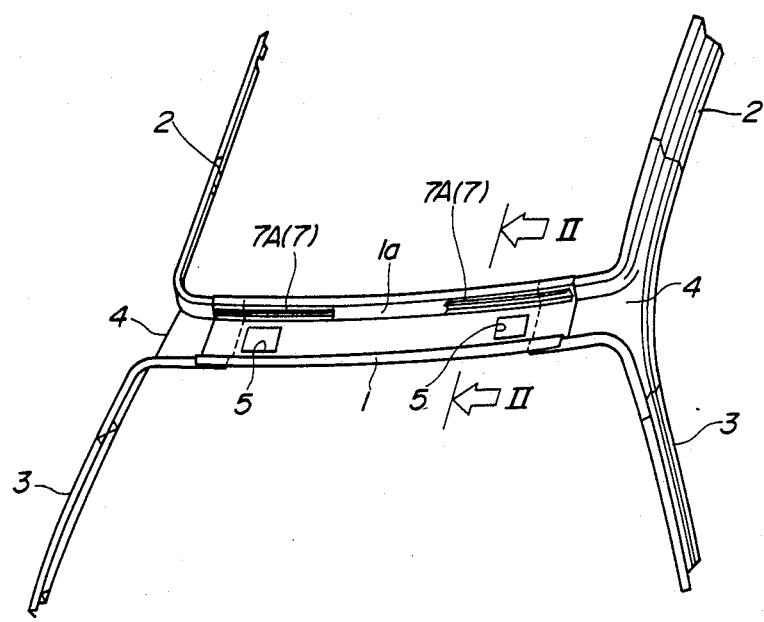
FIG. 1 is a perspective view of a vehicle body construction according to an embodiment of the present invention.
Figure 2:
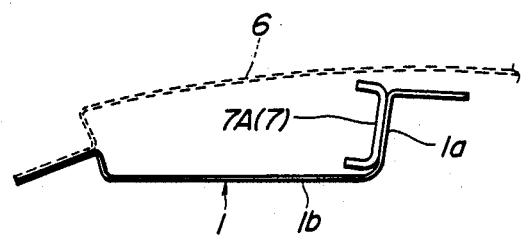
FIG. 2 is a sectional view taken along the line II—II of FIG. 1.
Figure 7:
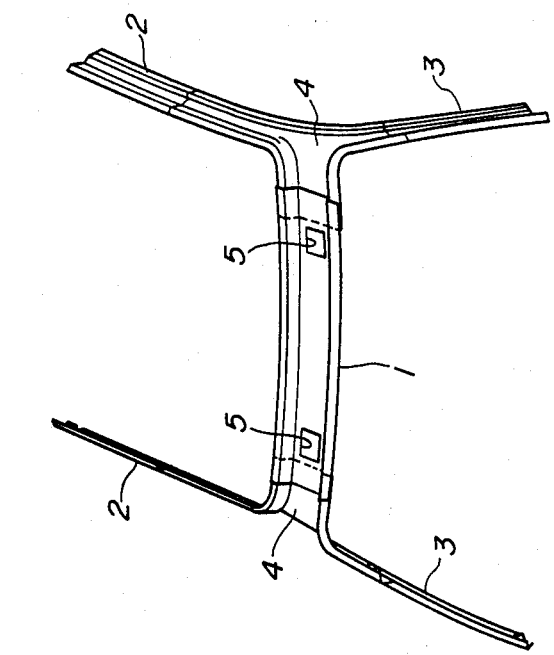
FIG. 7 is a view similar to FIG. 1 but shows a prior art vehicle body construction.

Referring to FIG. 1 and 2 in which parts and portions like or corresponding to the prior art structure of FIG. 7 are designated by the same reference characters, the front roof rail 1 is provided with a pair of buckling guides 7, 7. In this embodiment, each buckling guide 7 is in the form of an elongated reinforcement member 7A of a channel-shaped cross section and arranged so as to extend from the end portion of the front roof rail 1 to the portion near the center of same. More specifically, the reinforcement member 7A is placed upon a front surface of a rear upstanding wall 1a of the front roof rail 1 in such a way that the reinforcement member 7A and the front roof rail 1 have a common end, i.e., the reinforcement member 7A has a longitudinally inner end near the central portion of the roof side rail 1 and a longitudinally outer end coincident with the end of the roof side rail 1. The reinforcement member 7A is thus secured together with the end portion of the roof side rail 1 to the mating corner joint member 4. A roof is shown by dotted lines in FIG. 2 and indicated by 6.

Figure 3:
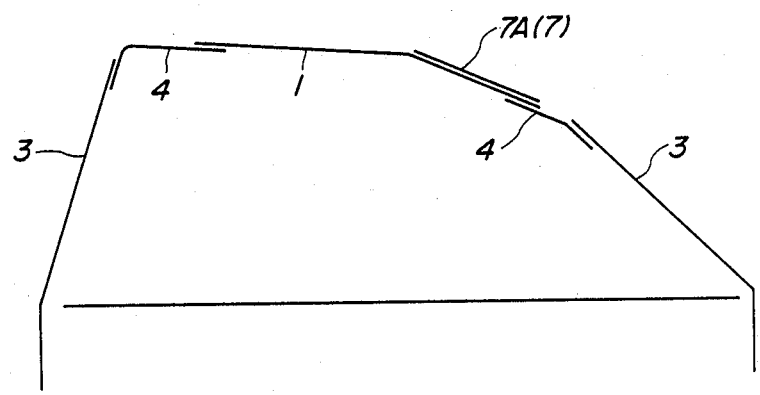
FIG. 3 shows the vehicle body construction of FIG. 1 in its buckled or collapsed state.

With the above structure, an external force applied to the front corner portion of the roof 6 in case of an accident as overturn of a vehicle will cause the front roof rail 1 to buckle or bend in the place at which the inner end of the reinforcement member 7A is located as shown in FIG. 3 since the front roof rail 1 is reinforced at and near the end portion by the reinforcement member 7A. The buckled or bent portion of the front roof rail 1 is positioned nearer the central portion by the effect of the reinforcement member 7A, whereby the front corner portion of the roof 6 needs to collapse much more than before in order to cause breakage of the windshield panel 8. In other words, it becomes possible to considerably reduce the probability or possibility of breakage of the windshield 8 and reduce the degree of bending of the front roof rail 1 at a particular portion thereof.

Figure 4:
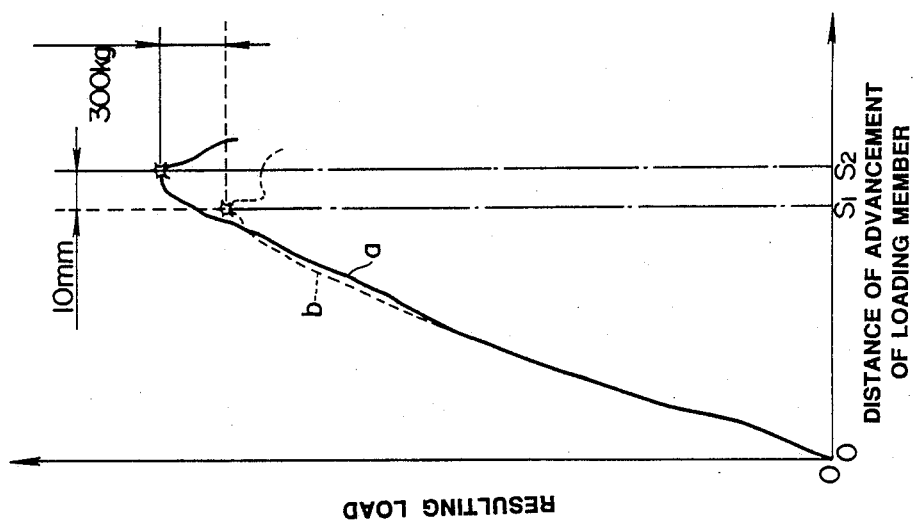
FIG. 4 show how the vehicle body construction of FIG. 1 buckles to cause breakage of an associated windshield panel when subjected to an external force at a front corner of a roof.

Experiments were conducted to the vehicle body construction which is constructed so that the width of the roof in the vehicle width direction is 1035 mm, the length of the front roof rail in the vehicle width direction is 875 mm, the thickness of the sheet forming the front roof rail is 0.65 mm, the thickness of the sheet forming the corner joint member is 1.0 mm, the length of the reinforcement member is 260 mm and the thickness of the sheet forming the reinforcement member is 1.4 mm, to test how the vehicle body construction buckles or collapses when an external force is applied by a loading member "W" to the front corner portion of the roof as shown in FIG. 4. By the experiments, it was found that the buckling or bending of the front roof rail 1 occurred in a particular place "P" near the central portion where the end of the reinforcement member 7A was positioned and the breakage of the windshield panel 8 occurred when the loading member "W" was made to advance the distance S2 from the position where it is just in contact with the front corner of the roof 6 and the front roof rail 1 was buckled or bent so as to make an angle $\theta 1$ with the adjacent end portion of the corner joint member 4.

Figure 9:
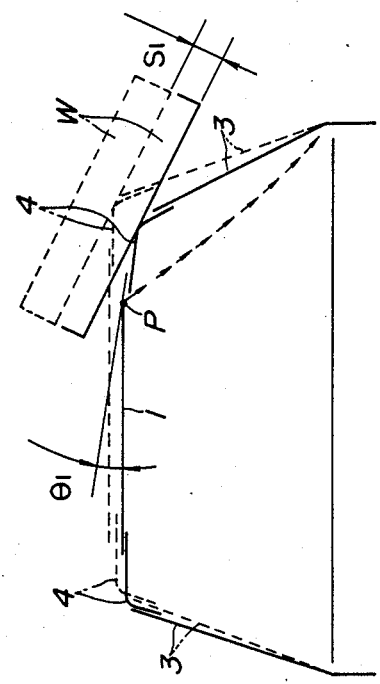
FIG. 9 shows how the vehicle body construction of FIG. 8 buckles and its associated windshield panel breaks when an external force is applied to a front corner portion of a roof.

Experiments were also conducted by the inventor to the comparable prior art vehicle body construction of FIG. 7 and it was found that the windshield panel 8 broke along the line indicated by the arrows shown in FIG. 9 when an external force is applied to the front corner portion of the roof near the corner joint member 4 by means of a loading member "W" which was made to advance the distance S1 from the position where it is just in contact with the front corner of the roof 6 for thereby causing the front roof rail 1 to buckle or bend at the point "P" so as to make an angle $\theta 1$ with the adjacent end portion of the corner joint member 4.

Figure 5:
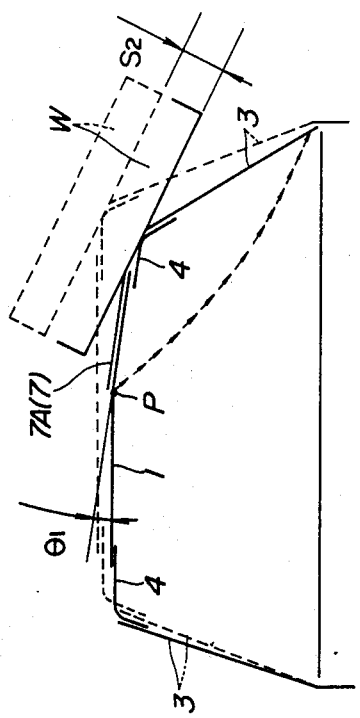
FIG. 5 is a graph showing the relation of a distance of advancement of a loading member from a position where it is just in contact with the vehicle body construction and the resulting load applied to the vehicle body construction of FIG. 1 having fitted therein the windshield panel.

In FIG. 5, the dotted line curve "b" indicates the test result of the prior art construction and the solid line curve "a" indicates the test result of the structure of this invention. As will be seen from the graph, the load at which breakage of the windshield occurs in case of the vehicle body construction of this invention is larger by 300 kg than that in case of the prior art construction. Further, the maximum distance S2 of advancement of the loading member "W" at which breakage of the windshield occurs in case of the vehicle body construction of this invention can be larger by 10 mm than that in case of the prior art construction.

Figure 6:
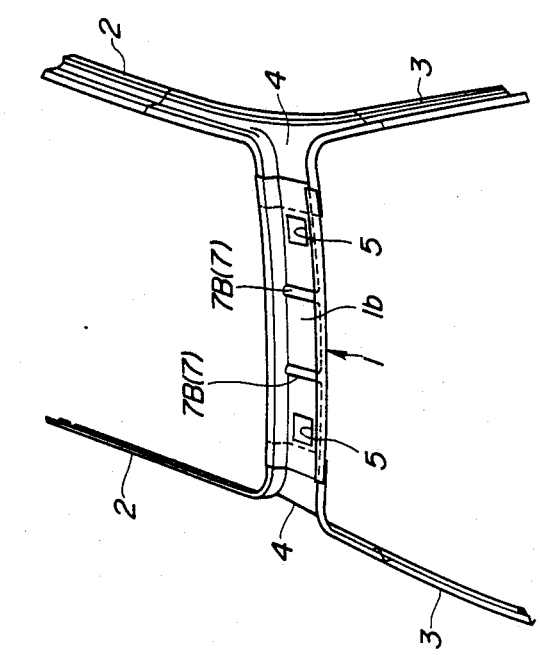
FIG. 6 is a view similar to FIG. 1 but shows another embodiment.
Figure 8:
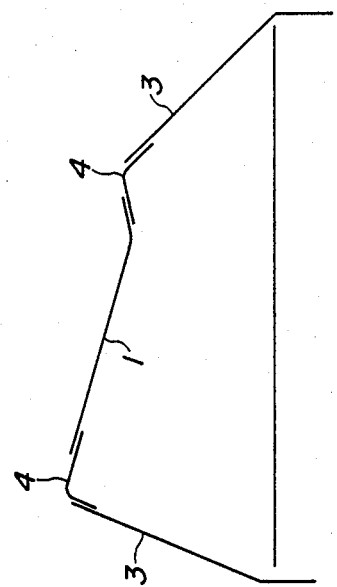
FIG. 8 shows the vehicle body construction of FIG. 7 in its buckled or collapsed state.

While a reinforcement member 7A is used as a buckling guide in the above described embodiment, this is not limitative. For example, as shown in FIG. 6, the front roof rail 1 may have a bottom wall 1a which is formed with a pair of beads 7B, 7B elongated longitudinally of the vehicle body so that buckling or bending of the front roof rail 1 occurs in the places at which the beads 7B, 7B are positioned. By this, it becomes possible to dispense with the independent reinforcement members.

What is claimed is:

1. A vehicle body construction comprising:
   a front roof rail having an end portion and a central portion;
   a roof side rail inner;
   a front pillar inner;
   a trifurcated joint member joined to said end portion of front roof rail and further to said roof side rail inner and said front pillar inner; and
   bucking guide means for determining the place at which said front roof rail is liable to buckle in such a way that said place is spaced away from said end portion toward said central portion.

2. The vehicle body construction according to claim 1 wherein said bucking guide means comprises an elongated reinforcement member secured to said front roof rail in such a way as to extend from said end portion toward said central portion.

3. The vehicle body construction according to claim 2 wherein said front roof rail has a rear upstanding wall, and said reinforcement member has a channel-shaped cross section and is secured to a front side surface of said rear upstanding wall.

4. The vehicle body construction according to claim 1 wherein said buckling guide comprises a longitudinal bead formed in said front roof rail.

5. The vehicle body construction according to claim 4 wherein said front roof rail has a bottom wall in which said bead is formed in such a way as to extend longitudinally of a vehicle body.

6. The vehicle body construction according to claim 1 wherein said front roof rail is formed with an access hole near said end portion.

* * * * *